(12) United States Patent
Witte

(10) Patent No.: US 6,616,602 B1
(45) Date of Patent: Sep. 9, 2003

(54) ENDOSCOPE WITH MAGNETIC ACTUATION

(75) Inventor: Lars Witte, Hamburg (DE)

(73) Assignee: Olympus Winter & Ibe GmbH, Hamburg (DE)

(\*) Notice: Subject to any disclaimer, the term of this patent is extended or adjusted under 35 U.S.C. 154(b) by 0 days.

(21) Appl. No.: 09/980,051

(22) PCT Filed: Jun. 15, 2000

(86) PCT No.: PCT/EP00/05480
§ 371 (c)(1),
(2), (4) Date: Nov. 29, 2001

(87) PCT Pub. No.: WO00/79323
PCT Pub. Date: Dec. 28, 2000

(30) Foreign Application Priority Data

Jun. 18, 1999 (DE) .......................................... 199 27 814

(51) Int. Cl.[7] ................................................ A61B 1/00
(52) U.S. Cl. .................. 600/167; 600/168; 600/163; 600/173
(58) Field of Search ................... 600/167, 168, 600/163, 112, 174, 131; 359/824, 823, 822, 694, 903

(56) References Cited

U.S. PATENT DOCUMENTS

| 5,359,992 | A | \* | 11/1994 | Hori et al. ........................ 126/4 |
| 5,575,757 | A | \* | 11/1996 | Kennedy et al. ............. 600/167 |
| 5,706,143 | A | \* | 1/1998 | Hipp ............................ 359/824 |
| 5,836,867 | A | | 11/1998 | Speier et al. |
| 6,099,467 | A | \* | 8/2000 | Kehr et al. .................. 600/167 |
| 6,425,857 | B1 | \* | 7/2002 | Rudischhauser et al. .... 600/112 |

FOREIGN PATENT DOCUMENTS

| DE | 195 21 654 A1 | 12/1996 |
| EP | 0 347 140 | 12/1989 |

\* cited by examiner

Primary Examiner—John P. Leubecker
(74) Attorney, Agent, or Firm—Rankin, Hill, Porter & Clark LLP

(57) ABSTRACT

An endoscope with a sealed housing having inner magnetic structures coupled to a displacement element and outer magnetic structures coupled to an adjustment element. The inner and outer magnetic structures are magnetically coupled to each other through the wall of the housing and are displaceable parallel to the wall. The inner magnetic structure is displaceable toward and away from stop and the outer magnetic structure magnetically drives the inner structure. The outer magnetic structure can be affixed beyond the stop position of the inner structure in a secured adjustment position.

3 Claims, 1 Drawing Sheet

ENDOSCOPE WITH MAGNETIC
ACTUATION

BACKGROUND OF THE INVENTION

1. Field of the Invention

The present invention relates to an endoscope having a sealed housing and magnetic structures, wherein an inner magnetic structure is coupled with a drive element and an outer magnetic structure is coupled with an adjustment element.

2. Description of Related Art

Endoscopes fitted with a sealed housing may receive, in a protected manner, their susceptible components such as optical lens elements, precision mechanical parts, electronic devices and the like. Accordingly, they are well applicable to medical purposes and shield the internal components from body fluids, sterilizing media, and sterilizing steam.

Displacement devices configured inside the sealed housing illustratively are used to switch valves for lines passing through the housing, drive electrical switches and, in particular, to adjust optical devices such as deflecting mirrors, lens elements, polarizing filters and the like. External control of such devices through the housing wall, however, does raise problems because such a control implemented through sealed, mechanical feedthroughs can be vapor-tight in the long run only at the cost of great difficulties.

As a result, endoscopes of this sort make use of an adjustment device whereby one or several magnetic structures physically engage, through the non-magnetic wall, other oppositely configured internal magnetic structures so as to implement an internal displacement to appropriately drive the corresponding components into adjustment. This design attains a hermetically sealed housing free of any feedthroughs.

Endoscopes of this kind are known from the German patent documents 197 18 189 A1, 195 21 654 A1 and 197 13 276 A1 and also from U.S. Pat. No. 5,836,867.

All these designs apply to continuous adjustment over a given range and require very accurate displacement, which most of the time is implemented by several pairs of mutually interacting permanent magnets. Unfortunately, such designs are very cumbersome. Even so, the are affected by a residual positioning inaccuracy because the outer magnets are unable to position the inner one(s) with 100% accuracy.

SUMMARY OF THE INVENTION

It is an objective of the present invention to create an endoscope of the above-mentioned kind of which the design is simple and which offers accurate adjustment.

In the present invention, as in the designs of the state of the art, the outer magnetic structure drives the inner one by its field, that is inaccurately. However, the outer magnetic structure moves the inner magnetic structure against a stop and then moves one step further and secures the inner magnetic structure in an adjustment position and keeps holding it against the stop by means of its fields and thereby keeps it in a 100% accurate position. In the invention, high magnetic forces are attained in much simpler manner.

When using the conventional tubular endoscope housing-wall, the design of the invention may be applied, for instance, to axially adjust a lens element or the like. Moreover, only one position of the drive element might require high accuracy while less accurate displacement corresponding to the state of the art will be acceptable in the remaining range of displacement. This design is very well suited for rotating an internal drive element between two reference positions. Illustratively, this design allows setting a polarizing filter precisely at 0° and at 90°.

In further accordance with the present invention, rotational adjustment is feasible as in the state of the art. However, the drive element is axially held within the housing against a stop. In case a polarizing filter is used, as already mentioned above, it shall therefore be kept axially against a suitable rotation stop. In this manner any mechanical play can be eliminated and a second support need not be used.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

These figures show an endoscope which in the region shown consists of a housing constituted by a wall 1 that fully encloses an inner space and seals the inner space from the outside. A magnetic drive system is shown in the region.

Figure 1:
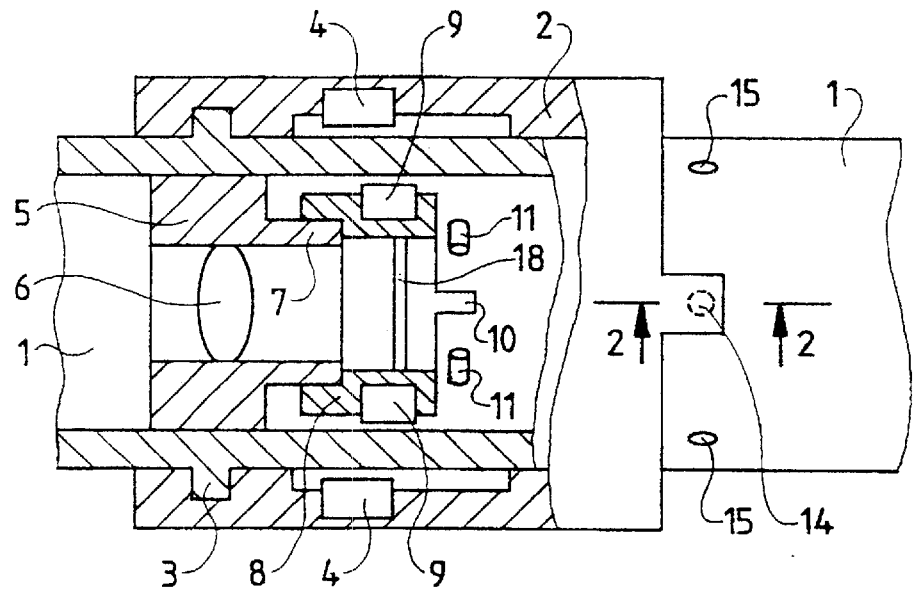
FIG. 1 shows an axial section of an endoscope designed for rotational adjustment.

The magnetic drive system comprises an outer adjusting element comprising an outer ring 2 which, as shown in FIG. 1, is axially secured to and rotatably supported on an outer flange 3 of the wall 1. In this illustrative embodiment, two external magnetic structures 4 are affixed on the ring 2 and, illustratively, are in the form of permanent magnets of which one pole points radially inwardly.

In this embodiment, an element 5 of an optical device denoted by a lens 6 is affixed to the inside wall 1. The element 5 comprises a tubular flange 7 concentric with the axis of the tube 1 and acting as a support to an inner ring 8 that rotates on the flange 7 and which is shown axially secured against the tubular flange 7.

Two internal magnetic structures 9 are affixed to the inner ring 8 and may again be in the form of permanent magnets, each with one pole pointing radially outwardly. However, and in illustrative manner, the outer magnetic structures 4 may be permanent magnets and the inner magnetic structures 9 may merely be made of a highly magnetically permeable iron material. In order to not interfere with the magnetic fields set up between the magnetic structures 4, 9, the remaining components shown in the Figure and, in particular, the wall 1 are made of a magnetically well transparent non-magnetic material, such as an appropriate high-grade steel.

Figure 3:
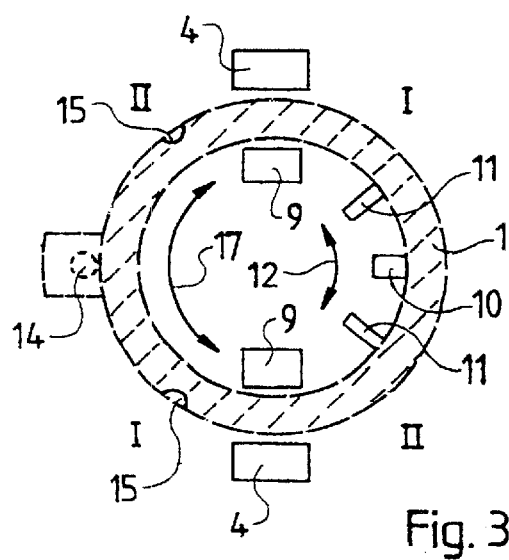
FIG. 3 is a highly diagrammatical cross-section relating to FIG. 1.

As illustrated in FIG. 3, the inner and outer magnetic structures 9, 4 are exactly opposite each other at the wall 1. They are configured for attraction. Accordingly, rotation of the outer ring 2 will drag along the inner ring 8. However, the magnets 4, 9 also may be configured in repulsive manner if appropriately and somewhat mutually staggered, and attain the same magnetic ganging whereby the outer ring 2 drives the inner ring 8. A single pair of magnets 4, 9, for instance, also may be substituted for the above discussed two pairs of magnets, for instance the pair shown in FIG. 1, to attain magnetic ganging.

As shown in FIGS. 1 and 3, the inner ring 8 is peripherally fitted with an axial protrusion 10. Two stops 11 are affixed in the range of rotation of the protrusion 10 to the inside surface of the wall 1. Accordingly, the inner ring 8 may be rotated only within the angular range 12 shown in FIG. 3.

Figure 2:
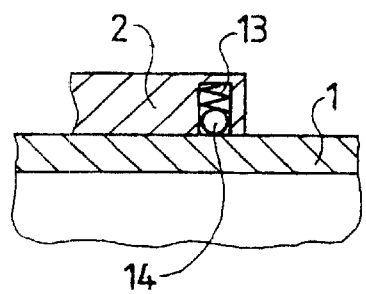
FIG. 2 is a partial section along line 2—2 of FIG. 1.

As shown in FIGS. 1 and 2, the outer ring 2 defines a radially configured duct that receives a detent ball 14 compressed by a spring 13. Two detent recesses 15 are present in the outer surface of the wall 1 and in the rotational displacement path of the ball 14 of the outer ring 2. The two detent recesses are spaced apart by the angular distance 17 indicated in FIG. 3.

In the rotational position of the two rings 2 and 8 shown in FIGS. 1 and 2, these rings will be mutually magnetically coupled and will be situated centrally between the limit points of their motion. If now the outer ring 2 acting as the adjustment element is manually seized and, illustratively, is rotated clockwise into the position I (FIG. 3) where it will be secured in snap-in manner, then the inner ring will participate in this rotation until it too attains the position I, resting by its protrusion 10 against one of the limit stop 11. Because the angular range 17 of the outer ring 2 slightly exceeds the angular range 12 of the inner ring 8, the two outer magnets 4 are rotated somewhat farther than the inner magnets 9 are able to follow. The inner ring 8, therefore, is held magnetically against the stop 11 in the precisely adjusted position. When the direction of rotation is reversed, the system can be rotated from the position I into the position II with the same efficacy to attain a secured stop.

As shown in FIG. 1, the inner ring 8 adjusts the angular position of the illustrative polarizing filter 18 which, in this way, can be very accurately adjusted by a given angle, namely the angular range 12 (FIG. 3), in two angular positions.

Moreover, angular positions also may be set between the two limit stops 11, that is, the limit positions I and II shown in FIG. 3, and may be kept in place by the magnetic coupling between the pairs of magnets 4, 9, though at a lesser accuracy of adjustment.

As shown in FIG. 1, the configuration of the outer magnetic structure 4 is axially offset from the inner magnetic structure 9. The outer ring 2 is axially held in place on the flange 3. As a result, an axial force shall be exerted on the inner ring 8 and will pull it toward the tubular flange 7 where it shall be held in the axial stop position shown in FIG. 1. Any play, therefore, shall have been eliminated. A precise axial spacing between the polarizing filter 18 and the lens element 6 shall thus be assured. Illustratively, a further lens element to be kept at a precise distance can be mounted furthermore in the ring 2. Because the inner ring 8 is magnetically held against the tubular flange 7, this design of the invention does not require a support for the inner ring 8 on its side axially opposite the tubular flange 7.

What is claimed is:

1. An endoscope comprising a sealed housing wall and magnetic structures, said magnetic structures including an inner magnetic structure and an outer magnetic structure, the inner magnetic structure being coupled with a drive element and the outer magnetic structure being coupled with an adjustment element, said magnetic structures magnetically interacting through the housing wall and being displaceable parallel to said wall, wherein the inner magnetic structure is displaceable relative to a stop and wherein the outer magnetic structure, while magnetically ganged to the inner magnetic structure, is configured in an affixable manner beyond the stop of the inner magnetic structure into at least one secured adjustment position.

2. The endoscope as claimed in claim 1, further comprising a tubular wall, wherein the inner and outer magnetic structures are mounted on rotatably supported and axially secured inner and outer rings, the inner ring cooperating with two rotational stops and the outer ring respectively, cooperating with two secured adjustment positions between which the outer ring is adjustable.

3. The endoscope as claimed in claim 2, wherein the outer magnetic structure is axially offset from the inner magnetic structure.

* * * * *

UNITED STATES PATENT AND TRADEMARK OFFICE
CERTIFICATE OF CORRECTION

PATENT NO.    : 6,616,602 B1
DATED         : September 9, 2003
INVENTOR(S)   : Witte It is certified that error appears in the above-identified patent and that said Letters Patent is hereby corrected as shown below:

<u>Column 4,</u>
Line 32, after "rings" insert -- respectively --.
Line 33, after "ring" delete "respectively".

Signed and Sealed this

Twentieth Day of January, 2004

JON W. DUDAS
*Acting Director of the United States Patent and Trademark Office*